US008156226B2

(12) United States Patent
Gasca, Jr. et al.

(10) Patent No.: US 8,156,226 B2
(45) Date of Patent: *Apr. 10, 2012

(54) ORDERING PROVISIONING REQUEST EXECUTION BASED ON SERVICE LEVEL AGREEMENT AND CUSTOMER ENTITLEMENT

(75) Inventors: Miguel Edmundo Gasca, Jr., San Bernardino, CA (US); Elfred Pagan, Ponce, PR (US); Abigail Alice Tittizer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/264,323

(22) Filed: Nov. 4, 2008

(65) Prior Publication Data
US 2009/0070770 A1    Mar. 12, 2009

Related U.S. Application Data

(63) Continuation of application No. 10/756,151, filed on Jan. 13, 2004, now Pat. No. 7,461,149.

(51) Int. Cl.
G06F 15/173    (2006.01)
(52) U.S. Cl. ........ 709/226; 709/203; 709/220; 709/229; 718/103; 718/104
(58) Field of Classification Search .......... 709/202–203, 709/220–221, 225–226, 229; 718/102–104
See application file for complete search history.

(56) References Cited

U.S. PATENT DOCUMENTS

| 5,870,667 | A | 2/1999 | Globuschutz |
| 5,987,021 | A | 11/1999 | Erickson et al. |
| 6,098,099 | A | 8/2000 | Ellesson et al. |
| 6,304,647 | B1 | 10/2001 | Frost |
| 6,349,093 | B1 | 2/2002 | Caldwell et al. |
| 6,556,544 | B1 | 4/2003 | Lee |
| 6,662,221 | B1 | 12/2003 | Gonda et al. |
| 6,816,905 | B1 | 11/2004 | Sheets et al. |
| 7,062,559 | B2 | 6/2006 | Yoshimura et al. |
| 7,359,971 | B2 | 4/2008 | Jorgensen |
| 7,461,149 | B2 * | 12/2008 | Gasca et al. ................. 709/226 |
| 2003/0046396 | A1 * | 3/2003 | Richter et al. ............... 709/226 |

OTHER PUBLICATIONS

"alphaWorks web page: Agent Building and Learning Environment", IBM Corporation, available at http://www.alphaWorks.ibm.com/tech/able, accessed Oct. 15, 2003, 3 pages.
"An Architectureal Blueprint for Autonomic Computing", IBM Corporation, (2003), available at http://www.ibm.com/autonomic/pdfs/ACwpFinal.pdf, accessed Sep. 25, 2003, 37 pages.
Bigus, J.P., "ABLE: A Toolkit for Building Multiagent Autonomic Systems", IBM Systems Journal, vol. 41, No. 3, 2002, p. 350.

* cited by examiner

Primary Examiner — Bharat Barot
(74) Attorney, Agent, or Firm — Stephen R. Tkacs; Stephen J. Walder, Jr.; Mark C. Vallone

(57) ABSTRACT

A solution provided here comprises receiving requests for a service from a plurality of customers, responding to the requests for a service, utilizing a shared infrastructure, and configuring the shared infrastructure, based on stored customer information. Another example of such a solution comprises:
analyzing at least one provisioning request;
assigning a priority to the provisioning request, based on
  performance data and
  stored customer information;
configuring a shared infrastructure, according to
  the provisioning request and
  the priority; and
responding to requests for services, utilizing the shared infrastructure.

20 Claims, 4 Drawing Sheets

ORDERING PROVISIONING REQUEST EXECUTION BASED ON SERVICE LEVEL AGREEMENT AND CUSTOMER ENTITLEMENT

This application is a continuation of application Ser. No. 10/756,151, filed Jan. 13, 2004, status awaiting publication.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to coordinating the utilization of multiple computers, and more particularly to methods and systems of allocating shared computing resources.

BACKGROUND OF THE INVENTION

Where computing resources are shared among a number of customers, shared resources need to be allocated efficiently. A conventional solution is to treat all customers alike, and allocate resources in a first-come, first-served manner. However, customers are not all alike. Some customers may contract for premium services, and pay more than other customers, for example. Allocation decisions may be complex, and rapid changes of allocations may be required. Shared computing resources may handle large numbers of transactions, with heavy network traffic, and rapid fluctuations in volume.

Thus there is a need for methods and systems that allocate shared computing resources efficiently, taking into account pertinent information about the customers.

SUMMARY OF THE INVENTION

In one illustrative embodiment, a data processing system for allocating computing resources is provided. The data processing system comprises a processor and a memory coupled to the processor. The memory comprises instructions which, when executed by the processor, cause the processor to analyze at least one provisioning request and assign a priority to said at least one provisioning request, based on performance data and stored customer information for each of a plurality of customers. The stored customer information comprises service level agreement information comprising terms of a service level agreement for each of the plurality of customers. The instructions further cause the processor to configure a shared infrastructure, according to the provisioning request and the priority, and respond to requests for services, utilizing the shared infrastructure.

In another illustrative embodiment, a computer program product comprises a computer recordable medium having a computer readable program recorded thereon. The computer readable program, when executed on a computing device, causes the computing device to analyze at least one provisioning request and assign a priority to the at least one provisioning request, based on performance data and stored customer information for each of a plurality of customers. The stored customer information comprises service level agreement information comprising terms of a service level agreement for each of the plurality of customers. The computer readable program further causes the computing device to configure a shared infrastructure, according to the provisioning request and the priority, and respond to requests for services, utilizing the shared infrastructure.

In another illustrative embodiment, a computer program product comprises a computer recordable medium having a computer readable program recorded thereon. The computer readable program, when executed on a computing device, causes the computing device to receive requests for services from a plurality of customers, respond to the requests for services, utilizing a shared infrastructure, and configure the shared infrastructure, based on stored customer information for the plurality of customers. The stored customer information comprises service level agreement information comprising terms of a service level agreement for each of the plurality of customers. The configuring comprises assigning a priority to the requests, based on the terms of the service level agreement for each of the plurality of customers.

These and other features of the illustrative embodiments will be described in, or will become apparent to those of ordinary skill in the art in view of, the following detailed description of the example embodiments of the present invention.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Figure 1:
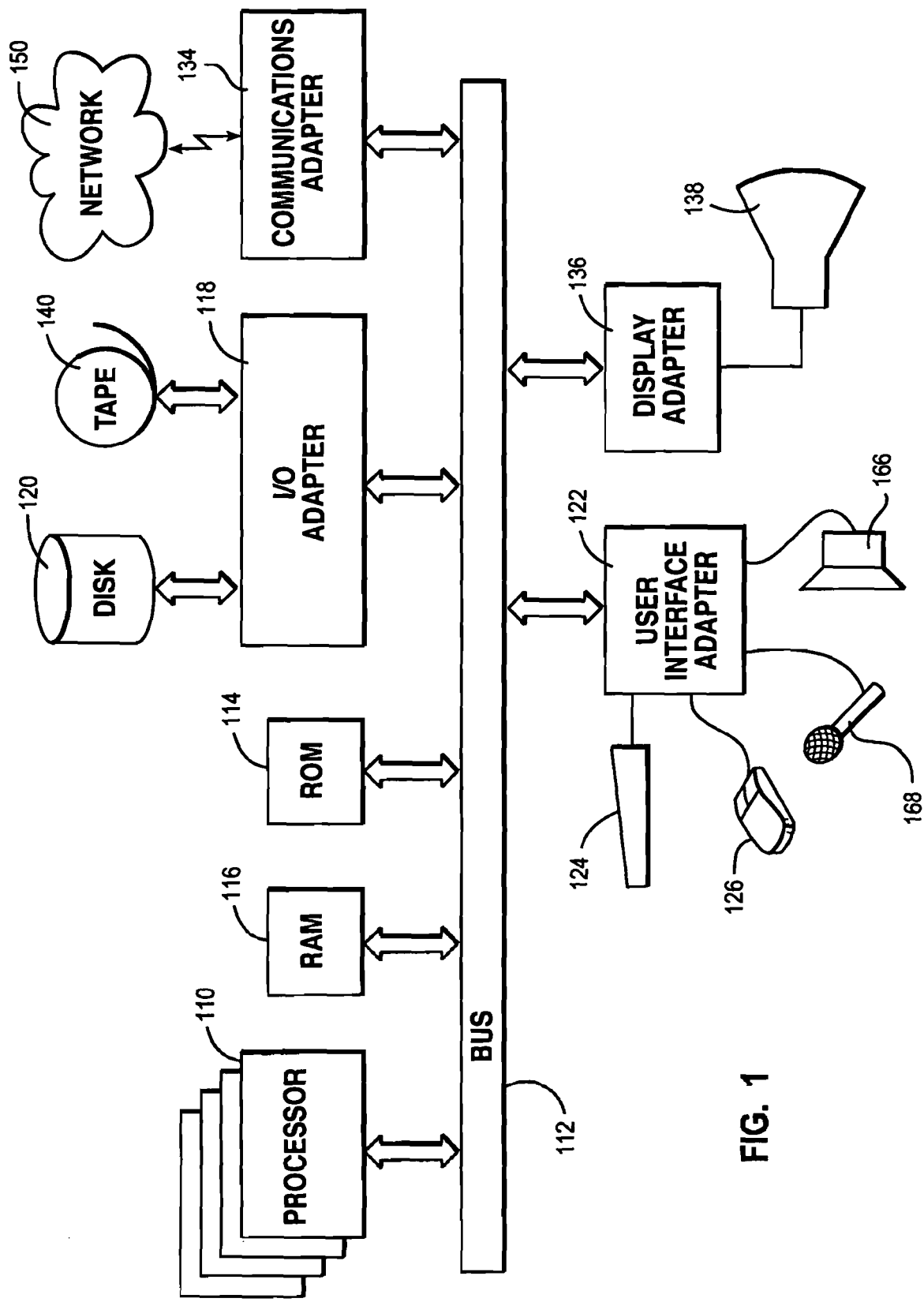
FIG. 1 illustrates a simplified example of a computer system capable of performing the present invention.

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Availability" means ability to be accessed or used.

"Business process" means any process involving use of a computer by any enterprise, group, or organization; the process may involve providing goods or services of any kind.

"Client" means any application that requests or utilizes a service. Examples of such a service include but are not limited to: information services, transactional services, access to databases, and access to audio or video content.

"Client-server application" means any application involving a client that utilizes a service, and a server that provides a service. Examples of such a service include but are not limited to: information services, transactional services, access to databases, and access to audio or video content.

"Component" means any element or part, and may include elements consisting of hardware or software or both.

"Computer-usable medium" means any kind of computer memory, such as floppy disks, hard disks, Random access memory (RAM), Read Only Memory (ROM), CD-ROM, flash ROM, non-volatile ROM, and non-volatile memory.

"Performance" means execution or doing; for example, "performance" may refer to any aspect of an application's operation, including availability, response time, time to complete batch processing or other aspects.

"Provisioning request" means any request to change an allocation or configuration.

"Response time" means elapsed time in responding to a request or signal.

"Service level agreement" (or "SLA") means any oral or written agreement between provider and user. For example, "service level agreement" includes but is not limited to an agreement between vendor and customer, and an agreement between an information technology department and an end user. For example, a "service level agreement" might involve one or more applications, and might include specifications regarding availability, response times or problem-solving.

"Shared infrastructure" means any shared set of hardware and software.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Threshold" means any value used as a borderline, standard, or target; for example, a "threshold value" may be derived from customer requirements, corporate objectives, a service level agreement, industry norms, or other sources.

"Web application" means any application utilizing a web browser or hypertext transfer protocol (HTTP).

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2A:
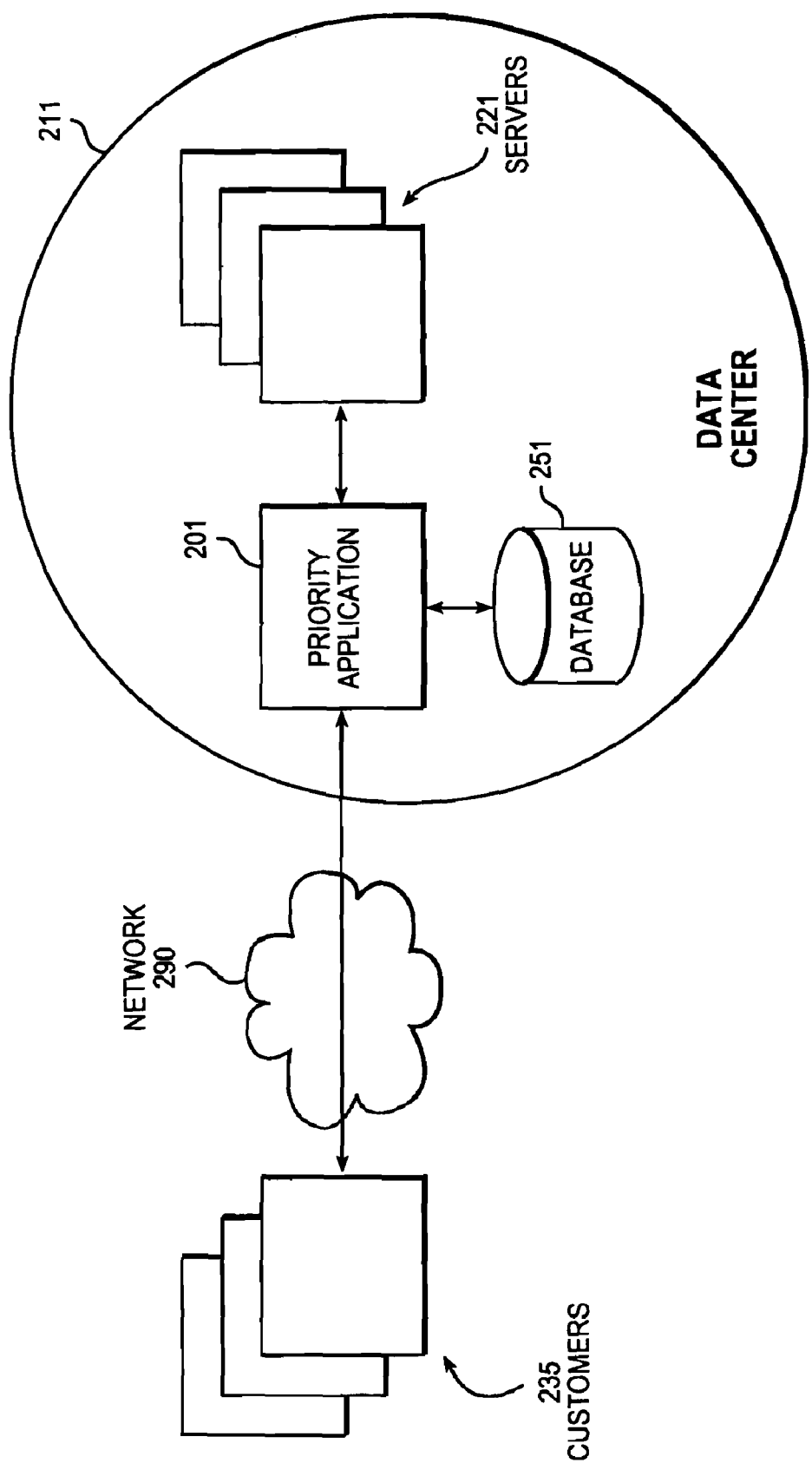
FIG. 2A is a simplified block diagram, illustrating an example of a method and system for allocating computing resources, according to the teachings of the present invention.

FIG. 2A is a simplified block diagram, illustrating an example of a method and system for allocating computing resources. Beginning with an overview, data center 211, including servers at 221, symbolize shared infrastructure (including a variety of network, server, and middleware components) that receives from the customers at 235 requests for services, and responds to those requests, via network 290. The example in FIG. 2A comprises receiving requests for services from a number of customers (at 235), responding to the requests for services, by utilizing the shared infrastructure of data center 211, and configuring the shared infrastructure, based on stored customer information (in database 251).

The double-headed arrow connecting priority application 201 with customers at 235 represents requests for services, and responses (these may involve any kind of client-server application, for example). Data center 211 may host web sites, or provide computing resources for business processes such as human resources, customer relationship management, shipping, finance, accounting, or insurance claims processing. The workload imposed on the shared infrastructure of data center 211 is ever-changing, requiring constant changes in allocation of computing resources. The allocation of computing resources among the customers at 235 may be changed, by changing the configuration of the shared infrastructure of data center 211. These changes could involve adding a resource to those allocated to a customer, taking away a resource, or modifying a resource. An example would be adding a web server to a load balanced group of web servers. This action would probably increase performance of the server group. Another example would be removing a server from a load balanced group of servers. This action would be taken when it is determined that a server is unneeded, and could be better utilized by configuring the shared infrastructure differently. The server in question could be made available to do the work of a different customer.

Priority application 201 receives or monitors requests for services from customers at 235. Priority application 201 chooses among possible configurations for the shared infrastructure of data center 211, based on stored customer information (in database 251). Priority application 201 may base its actions on other information as well, such as performance data concerning the shared infrastructure of data center 211, or predictions about workloads (predictions concerning utilization of the shared infrastructure of data center 211). The information such as performance data and predictions may be obtained from database 251 or other components. Configuring the shared infrastructure of data center 211 may involve assigning a priority, based on various categories of stored customer information, such as:

terms of a service level agreement;
actual violations of the terms;
penalties for violations of the terms;
sensitivity to violations of the terms; and
revenue attributed to one of the customers.

One way to accomplish automated changes in the configuration of the shared infrastructure of data center 211 is through provisioning requests. An example of a provisioning request is a request to a provisioning system (preferably a software component) to change a particular system configuration. The double-headed arrow connecting priority application 201 with servers at 221 may represent provisioning requests. Priority application 201 represents any hardware and software that prioritizes provisioning request execution. The system as illustrated by FIG. 2A is one example of a system where this could be used. In other examples, priority application 201 may or may not have requests coming directly from the customers at 235.

Figure 2B:
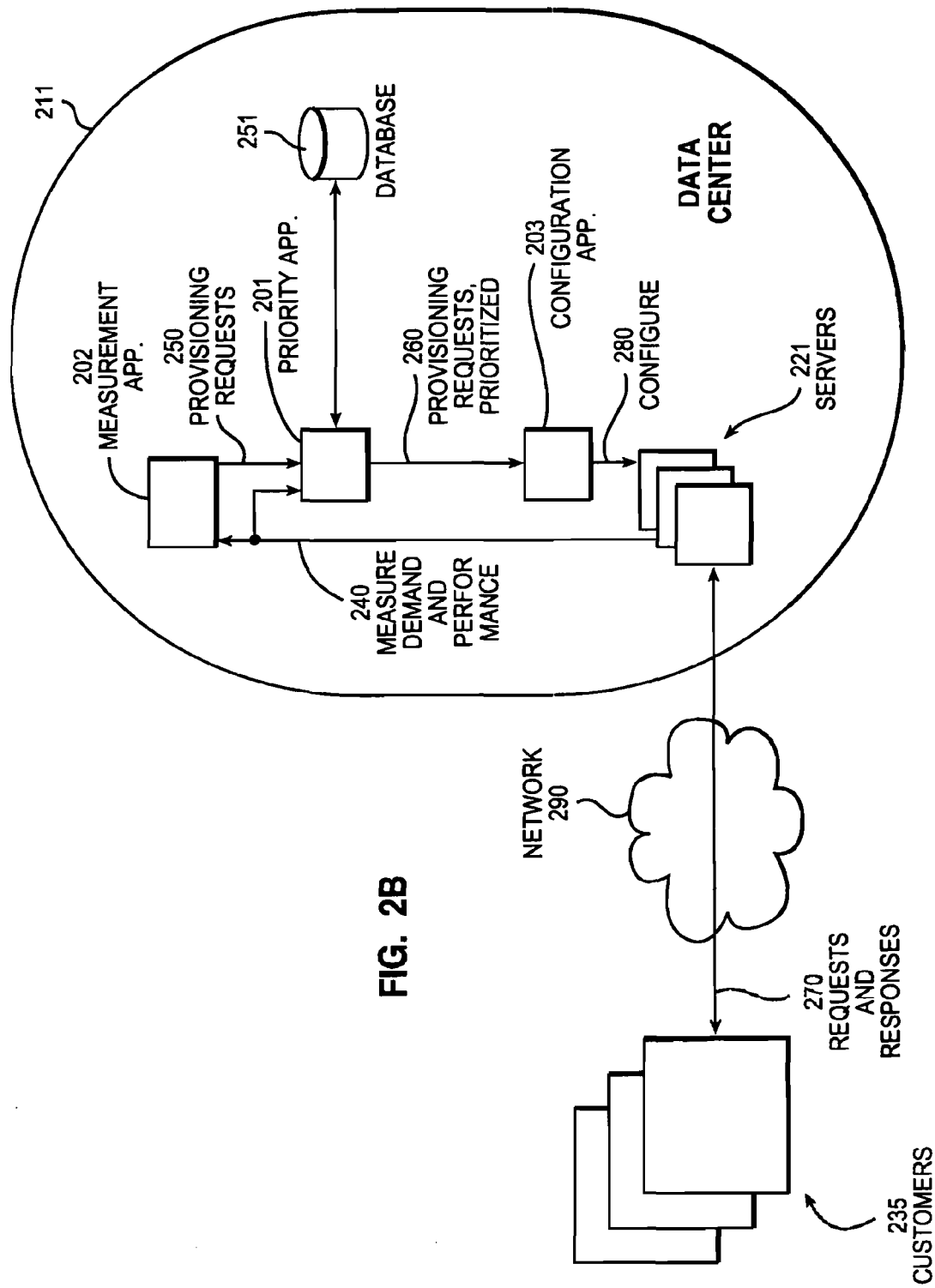
FIG. 2B is a block diagram, illustrating another example of a method and system for allocating computing resources, utilizing prioritized provisioning requests.

FIG. 2B is a block diagram, illustrating another example of a method and system for allocating computing resources, utilizing prioritized provisioning requests. The customers at 235 make requests for services against whatever applications are hosted by data center 211 (e.g. web sites, web applications, databases). The ever-changing workload increases and decreases demand on servers at 221 and other shared infrastructure in data center 211. Arrow 270 symbolizes requests for services, and responses, sent via network 290. Data center 211 symbolizes shared infrastructure, including a variety of network, server, and middleware components. Measurement application 202 is software which measures (arrow 240) the demand for various resources and predicts future resource consumption. Based on this prediction, measurement application 202 makes provisioning requests (arrow 250). The provisioning requests are prioritized by priority application 201. Priority application 201 may also use real-time performance data (shown by arrow 240) directly. Assigning a priority (at 201) may be done based on performance data (shown by arrow 240) and stored customer information (in database 251). Prioritized provisioning requests (arrow 260) are sent to a provisioning system (configuration application 203) to change system configurations (for example, adding a server to or removing a server from a load-balanced group of servers at 221).

Thus the example in FIG. 2B may involve creating (at 202) a provisioning request, corresponding to one of the customers at 235, and transmitting (arrows 250 and 260) the provisioning request. The configuring (arrow 280) of shared infrastructure in data center 211 is carried out according to the provisioning request. The example involves analyzing and assigning a priority (at 201) to provisioning requests, based on performance data and stored customer information (in database 251). The example involves configuring a shared infrastructure 211, according to the provisioning request and the priority, and responding to requests for services (270), utilizing the shared infrastructure 211. Assigning a priority may involve utilizing stored service level agreement information (in database 251). Configuring shared infrastructure 211 may be done at least partly according to predictions concerning utilization of the shared infrastructure.

As an alternative to treating one provisioning request, corresponding to one customer, at a time, consider grouping provisioning requests. The example in FIG. 2B may involve forming a group of provisioning requests (at 201), and including in the group provisioning requests corresponding to two or more of the customers at 235, so that the configuring of shared infrastructure 211 is carried out according to the group of provisioning requests. In other words, configuring shared infrastructure 211 according to the group of provisioning requests, may be carried out before configuring shared infrastructure 211 according to other provisioning requests that are not included in the group. Consider for example penalties for violating terms of a service level agreement. Consider hypothetical customers at 235 designated A, B, and C, with corresponding service level agreements A, B, and C. At some point in time, there may be corresponding provisioning requests A, B, and C, waiting to be executed. Measurement application 202 makes provisioning requests A, B, and C (arrow 250). The provisioning requests A, B, and C are prioritized by priority application 201. It is possible to configure shared infrastructure 211 to satisfy provisioning requests B and C, at the same time. It may be more cost effective to configure shared infrastructure 211 according to provisioning requests B and C, rather than provisioning request A, because the cost of a violation of agreements B and C together is higher than the cost of a violation of agreement A alone.

Continuing with details of the example, FIG. 2B illustrates means for responding to requests for services, utilizing shared infrastructure of data center 211. Customers' client applications are symbolized by rectangles at 235. These may be web browsers for utilizing web sites or web applications, and servers at 221 may be a pool of web servers hosting the web sites or web applications, for example. Or customers' client applications at 235 may be specialized clients for payroll services, and servers at 221 may provide computing power for payroll services, for example. The shared infrastructure of data center 211 includes means for configuring (configuration application 203) the shared infrastructure, according to provisioning request and priorities.

Measurement application 202 represents means for collecting (arrow 240) performance data from servers at 221 and other shared infrastructure such as storage components. Measurement application 202 also represents means for making predictions concerning utilization of said shared infrastructure. These aspects of measurement application 202 could be implemented with software products sold under the trademark TIVOLI (by IBM), for example.

Measurement application 202 also represents means for creating and transmitting said provisioning requests. These aspects of measurement application 202 could be implemented with JAVA, communicating with other components through web services technologies: hypertext transfer protocol (HTTP), extensible markup language (XML) and simple object access protocol (SOAP). Implementations for these web services technologies are freely available through the open-source software community. Other options for transmitting said provisioning requests are message-oriented middleware (such as software products sold under the trademark MQSERIES by IBM) or hypertext transfer protocol, secure (HTTPS).

Priority application 201 represents means for analyzing provisioning requests, and means for assigning a priority to a provisioning request, based on performance data and stored customer information. Priority application 201 may for example receive a provisioning request in the form of an XML document, and parse the XML document. The customer at 235, corresponding to the provisioning request, is identified. Stored customer information at 251 is retrieved and parsed. Database 251 represents means for utilizing stored service level agreement information. Database management software could be used, such as software products sold under the trademarks DB2 (by IBM), ORACLE, INFORMIX, SYBASE, MYSQL, Microsoft Corporation's SQL SERVER, or similar software.

Priority application 201 may also receive real-time performance data (arrow 240) from components that are handling requests for services from this customer. Priority application 201 may parse the real-time performance data for symptoms of trouble. For example, a symptom of an application running out of memory would indicate that this customer's application requires more resources soon.

Priority application 201 may include means for assigning a priority, utilizing a range of scores. Priority application 201 may include means for placing a provisioning request in a queue, according to said priority, and periodically adjusting the order of provisioning requests in the queue. Priority application 201 may include means for including provisioning requests in a provisioning-request group, and handling provisioning requests as a group, as discussed above.

A configuration application 203, associated with servers at 221, includes means for configuring shared infrastructure when it receives the provisioning request that has the highest priority (arrow 260). The configuration component 203 may for example receive a provisioning request in the form of an XML document, parse the XML document, and act on it (arrow 280, e.g. adding a web server to a load-balanced group of web servers).

Figure 3:
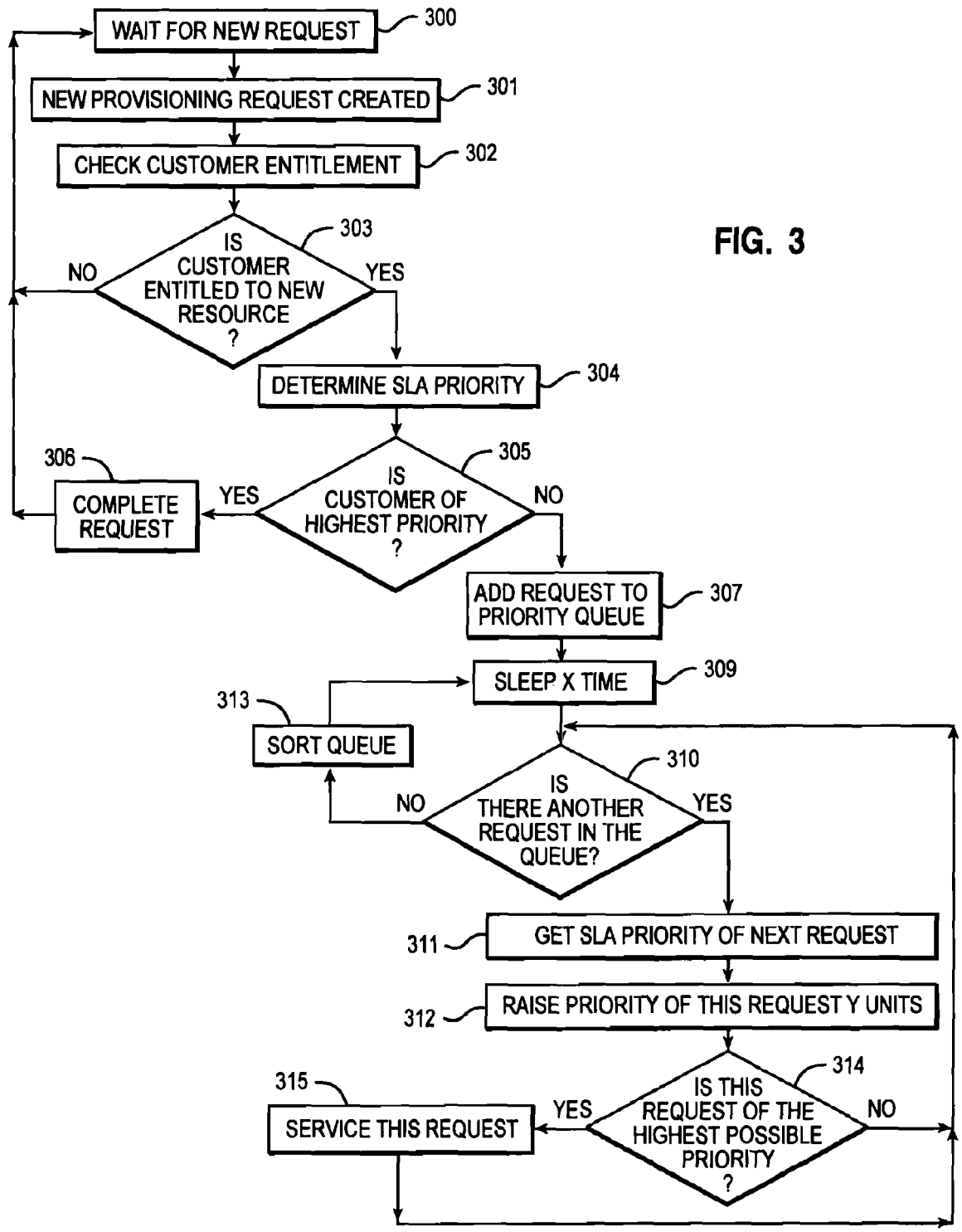
FIG. 3 is a flow chart illustrating an example of a process for allocating resources.

FIG. 3 is a flow chart illustrating an example of a process for allocating resources. At block 300, the process waits for a new provisioning request. At block 301, a new provisioning request is created and received. At block 302, customer entitlement is checked. Checking customer entitlement (302) is a matter of knowing what kind of resources are promised in the Service Level Agreement (SLA). For example, stored customer information extracted from an SLA may say that the customer is entitled to the use of Z number of database servers. If the provisioning request is for Z+1, the customer is not entitled to have that provisioning request filled. In another example, the SLA may say that the customer is entitled to whatever additional resources are needed, but the customer will be charged for them. Then the customer is entitled to whatever additional resources are needed. Additionally there could be time constraints (e.g. the customer is entitled to 20 servers between 8 am and 5 pm, but only 10 servers the rest of the time).

At decision 303, if the customer is not entitled to the new resources, the "No" branch is taken. The process waits for a new provisioning request at block 300. If on the other hand the customer is entitled to the new resource, the next step is block 304. Block 304 represents determining Service Level Agreement priority. This could be done by considering a number of factors, including how much money needs to be paid to the customer if there is a breach of the Service level Agreement, how much money that customer is worth in future business, how sensitive that customer is about having the service level agreement breached, whether the customer is a high profile customer, etc. Operations at block 304 may utilize stored customer information of an objective nature (e.g. annual revenue attributed to this customer), or a subjective nature (e.g. evaluations of the service provider's relationship with this customer, or of the latest violation of the SLA terms). Stored customer information is translated into a score reflecting priority. Operations at block 304 may include performance data (see description of block 312 below).

At decision 305, if this customer is of the highest priority, then the provisioning request is completed at block 306. A provisioning or configuration component receives the provisioning request, parses it, and acts on it. Perhaps a server is unneeded in its present assignment, and could be made available to do the work of this customer, by adding the server to a load-balanced group of web servers, for example. On the other hand, if this customer is not of the highest priority, the "No" branch is taken at decision 305, and the next step is at block 307.

Block 307 represents adding the provisioning request to the priority queue, rather than acting on the provisioning request immediately. Blocks 300-307 represent continuous operations of receiving provisioning requests and handling them according to entitlement and priority.

Blocks 309-315 represent handling the priority queue. At block 309 the process sleeps for the length of time X. X is configurable. After time X elapses, the process wakes up and checks the queue at decision 310. If there is no provisioning request in the queue, the "No" branch is taken to block 313, and back to block 309. On the other hand, if there are one or more provisioning requests in the queue, the "Yes" branch is taken to block 311. Block 311 represents checking an item in the queue, and getting the Service Level Agreement priority, or other stored customer information, for the customer who is making this provisioning request. Next, block 312 represents raising of the priority of this provisioning request by Y number of units, utilizing a range of scores. The quantity Y would be determined by how long this provisioning request has been in the queue. This step prevents any provisioning request from staying in the queue forever, and never being filled. Additional factors may be taken into account at block 312 (probability of a violation of the Service Level Agreement for this customer, or cost of a violation of the SLA, for example).

Decision 314 represents the question: is this provisioning request of the highest priority? For example, if priority is represented by a number from 1 to 10, with 1 being the highest priority, then this would true if this provisioning request has priority equal to 1. If this provisioning request is not of the highest priority, then the "No" branch is taken, and the process moves on to the next item in the queue at decision 310. On the other hand, if this provisioning request is of the highest priority, then the "Yes" branch is taken to block 315. Block 315 represents servicing this provisioning request. A configuration component receives the provisioning request that has the highest priority, parses it, and acts on it (adding a web server to a load-balanced group of web servers, for example). Then the process moves on to the next item in the queue at decision 310. The process repeats this path between decision 310 and decision 314, until all the items in the queue have been checked and adjusted. If there is no provisioning request left unexamined in this round, the "No" branch is taken to block 313. Block 313 represents sorting the queue if necessary. If the priority adjustments require a new order, the process places provisioning requests in their new positions. Then the process sleeps again for time X, at block 309.

Continuing with some details of FIG. 3, blocks 311-315 involve assigning a priority to each provisioning request, based on performance data and stored customer information, and configuring a shared infrastructure accordingly. Consider information that may be involved in getting the priority at block 311. Preferably, service level agreement terms are understandable by humans (service providers and customers) and readable by machines. SLA terms may be contained in an XML document for example. SLA terms may include thresholds such as a peak number of requests per hour that must receive a response, and a required response time. A basic number of requests per hour may be specified, and when that number is exceeded, a customer may pay a premium for responses. Another possible threshold is a maximum time in which to fix a service outage. There may be monetary penalties imposed on service providers for violating these thresholds. The process may assign a score at the high-priority end of a range, if:

there is a high probability of service level agreement violation; or there is a high cost of service level agreement violation; or both.

Consider probability of service level agreement violation, and adjusting priority at block 312. A priority application may receive real-time performance data from components that are handling requests for services from this customer. Availability, response times, and outage times may be monitored for this customer's applications. Certain component behaviors may be used as indicators of service degradation that will probably lead to violation of SLA terms. A symptom of an application running out of memory would indicate that this customer's application requires more resources soon. Measurement of free memory is one example. Thrashing behavior (frequent writing of data to disc, and reading data from disc, when random access memory is unavailable) is another symptom.

Consider data-storage resources. There may be performance data indicating that 85% of the allocated storage is being utilized. This data, together with a prediction that greatly increased storage will be required within one hour, would indicate that this customer's application requires more storage resources soon.

On the other hand, a component behavior may indicate under-utilization. A processor utilization measurement of 30% or less may indicate under-utilization. Perhaps this server is unneeded in its present assignment to this customer, and could be made available to do other work. A provisioning request calling for more resources for this customer would maintain a low-priority score.

Another quantity that may be considered in adjusting priority at block 312 is the amount of time after a low priority provisioning request that a higher priority provisioning request comes in.

Regarding FIG. 3, the order of the operations described above may be varied. For example, it is within the practice of the invention to handle a group of provisioning requests together, and to complete configuration according the group of provisioning requests simultaneously. Blocks in FIG. 3 could be arranged in a somewhat different order, but still describe the invention. Blocks could be added to the above-mentioned diagram to describe details, or optional features; some blocks could be subtracted to show a simplified example.

In conclusion, we have shown examples of allocating shared computing resources, taking into account pertinent information about the customers.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A data processing system for allocating computing resources, the data processing system comprising:
   a processor; and
   a memory coupled to the processor, wherein the memory comprises instructions which, when executed by the processor, perform a method, the method comprising:
   the processor analyzing at least one provisioning request;
   the processor assigning a priority to said at least one provisioning request, based on performance data and stored customer information for each of a plurality of customers, wherein the stored customer information comprises service level agreement information comprising terms of a service level agreement for each of the plurality of customers;
   the processor configuring a shared infrastructure, according to said provisioning request and said priority; and
   the processor responding to requests for services, utilizing said shared infrastructure.

2. The data processing system of claim 1, wherein:
   said configuring further comprises configuring according to predictions concerning utilization of said shared infrastructure.

3. The data processing system of claim 1, wherein the method further comprises:
   the processor creating said provisioning request; and
   the processor transmitting said provisioning request.

4. The data processing system of claim 1, wherein the method further comprises:
   the processor forming a provisioning-request group;
   wherein:
   said provisioning-request group corresponds to two or more customers; and
   said configuring further comprises configuring according to said provisioning-request group, before configuring according to other provisioning requests that are not included in said provisioning-request group.

5. The data processing system of claim 1, wherein said service level agreement information comprises:
   actual violations of said terms;
   penalties for violations of said terms; and
   sensitivity to violations of said terms.

6. The data processing system of claim 1, wherein the method further comprises:
   the processor placing said provisioning request in a queue, according to said priority.

7. The data processing system of claim 1, wherein said assigning a priority further comprises:
   utilizing a range of scores, having a high-priority end; and
   assigning a score at the high-priority end of said range of scores, if:
   there is a high probability of service level agreement violation; or
   there is a high cost of service level agreement violation; or both.

8. The data processing system of claim 1, wherein said customer information comprises revenue attributed to one of said customers.

9. A computer program product comprising a computer recordable medium having a computer readable program recorded thereon, wherein the computer readable program, when executed on a computing device, performs a method, the method comprising:

the computing device analyzing at least one provisioning request;

the computing device assigning a priority to said at least one provisioning request, based on performance data and stored customer information for each of a plurality of customers, wherein the stored customer information comprises service level agreement information comprising terms of a service level agreement for each of the plurality of customers;

the computing device configuring a shared infrastructure, according to said provisioning request and said priority; and the computing device responding to requests for services, utilizing said shared infrastructure.

10. The computer program product of claim 9, wherein:
said configuring further comprises configuring according to predictions concerning utilization of said shared infrastructure.

11. The computer program product of claim 9, wherein the method further comprises:
the computing device creating said provisioning request; and
the computing device transmitting said provisioning request.

12. The computer program product of claim 9, wherein the method further comprises:
the computing device forming a provisioning-request group; wherein:
said provisioning-request group corresponds to two or more customers; and
said configuring further comprises configuring according to said provisioning-request group, before configuring according to other provisioning requests that are not included in said provisioning-request group.

13. The computer program product of claim 9, wherein said assigning a priority further comprises:
utilizing stored service level agreement information.

14. The computer program product of claim 9, wherein the method further comprises:
the computing placing said provisioning request in a queue, according to said priority.

15. The computer program product of claim 9, wherein said assigning a priority further comprises:
utilizing a range of scores, having a high-priority end; and
assigning a score at the high-priority end of said range of scores, if:
there is a high probability of service level agreement violation; or
there is a high cost of service level agreement violation; or both.

16. The computer program product of claim 9, wherein said customer information comprises revenue attributed to one of said customers.

17. A computer program product comprising a computer recordable medium having a computer readable program recorded thereon, wherein the computer readable program, when executed on a computing device, performs a method, the method comprising:

the computing device receiving requests for services from a plurality of customers;

the computing device responding to said requests for services, utilizing a shared infrastructure; and the computing device configuring said shared infrastructure, based on stored customer information for the plurality of customers, wherein the stored customer information comprises service level agreement information comprising terms of a service level agreement for each of the plurality of customers;

wherein said configuring comprises assigning a priority to the requests, based on the terms of the service level agreement for each of the plurality of customers.

18. The computer program product of claim 17, wherein:
said configuring further comprises configuring based on predictions concerning utilization of said shared infrastructure.

19. The computer program product of claim 17, wherein:
said configuring further comprises assigning the priority, based on categories of said stored customer information, chosen from:
actual violations of said terms;
penalties for violations of said terms; and
sensitivity to violations of said terms.

20. The computer program product of claim 17, wherein said configuring further comprises assigning the priority based on revenue attributed to one of said customers.

* * * * *